United States Patent
Tseng

(10) Patent No.: US 9,868,236 B2
(45) Date of Patent: Jan. 16, 2018

(54) MANUFACTURING METHOD OF A COMPOSITE LONG FIBER PRODUCT

(71) Applicant: Kun-Nan Tseng, Xianxi Township, Changhua County (TW)

(72) Inventor: Kun-Nan Tseng, Xianxi Township, Changhua County (TW)

(*) Notice: Subject to any disclaimer, the term of this patent is extended or adjusted under 35 U.S.C. 154(b) by 326 days.

(21) Appl. No.: 14/845,658

(22) Filed: Sep. 4, 2015

(65) Prior Publication Data

US 2017/0066163 A1    Mar. 9, 2017

(51) Int. Cl.
*B29C 70/06*  (2006.01)
*B29C 45/00*  (2006.01)
*B29C 70/78*  (2006.01)

(52) U.S. Cl.
CPC ...... *B29C 45/0005* (2013.01); *B29C 45/0013* (2013.01); *B29C 70/06* (2013.01); *B29C 70/78* (2013.01); *B29C 45/0046* (2013.01)

(58) Field of Classification Search
None
See application file for complete search history.

(56) References Cited

U.S. PATENT DOCUMENTS

| | | | | |
|---|---|---|---|---|
| 3,857,813 A * | 12/1974 | Stain, Jr. | ........ | C08J 3/203 264/331.17 |
| 5,232,771 A * | 8/1993 | Fadell | ........ | B29C 45/0005 264/116 |
| 5,275,776 A * | 1/1994 | Hara | ........ | B29C 43/02 264/257 |
| 5,687,652 A * | 11/1997 | Ruma | ........ | B65D 19/0012 108/57.25 |
| 5,773,042 A * | 6/1998 | Amano | ........ | B29C 45/0005 425/207 |
| 6,461,140 B1 * | 10/2002 | Bosg | ........ | B29C 31/041 425/548 |
| 6,749,934 B2 * | 6/2004 | Nagayama | ........ | B29C 45/0005 428/220 |
| 9,713,887 B2 * | 7/2017 | Heidemeyer | ........ | B29C 45/1816 |
| 2007/0007685 A1 * | 1/2007 | Gleich | ........ | B29C 47/1081 264/102 |
| 2015/0239158 A1 * | 8/2015 | Heidemeyer | ........ | B29C 45/1816 264/328.18 |

* cited by examiner

*Primary Examiner* — Edmund Lee
(74) *Attorney, Agent, or Firm* — patenttm.us

(57) ABSTRACT

A manufacturing method of a composite long fiber product has steps of preparing base materials, mixing the base materials, and injection molding. In the step of preparing base materials, a first plastic base material, a second plastic base material, and a carbon fiber base material are prepared. In the step of mixing the base materials, the carbon fiber base material is grinded in a first mixing device and is mixed with the first plastic base material. An average length of the grinded carbon fiber base material is at least 10 millimeters. In the step of the injection molding, the first plastic base material and a mixture of the second plastic base material and the carbon fiber base material are injected into a molding device. The mixture of the second plastic base material and the carbon fiber base material can diffuse uniformly in the molding device.

3 Claims, No Drawings

MANUFACTURING METHOD OF A COMPOSITE LONG FIBER PRODUCT

BACKGROUND OF THE INVENTION

1. Field of the Invention

The present invention relates to a manufacturing method of a fiber product, and more particularly to a manufacturing method of a composite long fiber product.

2. Description of Related Art

A conventional manufacturing method of a fiber product comprises act of combining a base material with short fiber. The short fiber is applied for reinforcing an intensity of the fiber product, such as carbon fiber, glass fiber, or aramid fiber. An average length of the short fiber is less than 10 millimeters. When the short fiber is applied in the fiber product, fiber floating occurs to the fiber product easily. Further, if a thickness of the fiber product is insufficient, warpage occurs to the fiber product easily.

On the other hand, although the rigidness and the strength of the carbon fiber are more excellent than those of the glass fiber and the aramid fiber, carbon fiber affects the electromagnetic penetration, especially for an electronic product. Therefore, when the conventional fiber product is applied for an electronic product, electromagnetic interference may occur to the electronic product in use.

SUMMARY OF THE INVENTION

The main objective of the present invention is to provide a manufacturing method of a composite long fiber product to resolve the aforementioned problems.

The manufacturing method of a composite long fiber product has steps of:

Preparing base materials. A first plastic base material, a second plastic base material, and a carbon fiber base material are prepared.

Mixing the base materials. The second plastic base material and the carbon fiber base material are transported into a first mixing device, and the carbon fiber base material is grinded, wherein an average length of the grinded carbon fiber base material is at least 10 millimeters. Then, the grinded carbon fiber base material and the second plastic base material are mixed in the first mixing device.

Injection molding. The first plastic base material is transported into a first gate of a molding device. A mixture of the carbon fiber base material and the second plastic base material is transported into a second gate of the molding device, wherein a position of the second gate is higher than a position of the first gate. Then, the first plastic base material and the mixture of the carbon fiber base material and the second plastic base material are injected respectively from the first gate and the second gate into the molding device.

Other objectives, advantages and novel features of the present invention will become more apparent from the following detailed description.

BRIEF DESCRIPTION OF THE DRAWINGS

None.

DETAILED DESCRIPTION OF PREFERRED EMBODIMENT

A preferred embodiment of a manufacturing method of a composite long fiber product in accordance with the present invention has steps as the following.

1. Preparing base materials. In the preparing step, a first plastic base material, a second plastic base material, and a carbon fiber base material are prepared. The first plastic base material and the second plastic base material are thermoplastic, and the first plastic base material and the second plastic base material may be composed of the same material. The present invention can prepare more than two plastic base materials and other fibers according to different product demands.

2. Mixing the base materials. The second plastic base material and the carbon fiber base material are transported into a mixing device, wherein the carbon fiber base material is grinded, and then the second plastic base material and the grinded carbon base material are mixed in the mixing device. The carbon fiber base material is grinded to maintain an average fiber length of at least 10 millimeters.

3. Injection molding. The first plastic base material is transported into a first gate of a molding device, and the mixture of the carbon fiber base material and the second plastic base material is transported into a second gate of the molding device, wherein a position of the second gate is higher than a position of the first gate. Then, the first plastic base material and the mixture of the carbon fiber base material and the second plastic base material are injected into the molding device to form a composite long fiber product.

A density of the carbon fiber base material is larger than densities of the first plastic base material and the second plastic base material, such that after the mixture of the second plastic base material and the carbon fiber base material is injected into the molding device from the second gate, the carbon fiber base material diffuses downward since the second gate is located at a higher position relative to the first gate. In the meantime, the first plastic base material diffuses upward. After the diffusion, the carbon fiber base material can be spread uniformly in the molding device. Therefore, the composite long fiber product has a high strength due to the uniformly spread carbon fiber base material.

4. Removal from the mold. The composite long fiber product in the molding device is removed from the molding device and is cooled.

Furthermore, the carbon fiber base material may be applied with one or both of a glass fiber base material and an aramid fiber base material in the composite long fiber product. Taking for example application of the carbon fiber base material, the glass fiber base material and the aramid fiber base material in the composite long fiber product, the manufacturing method is described as the following.

In the step of preparing base materials, a third plastic base material, a fourth plastic base material, a glass fiber base material, and an aramid fiber base material are prepared. The third plastic base material and the fourth plastic base material may be composed of the same material as the first plastic base material and the second plastic base material.

In the step of mixing the base materials: the third plastic base material and the glass fiber base material are transported into the mixing device, and the fourth plastic base material is transported into another mixing device. The three mixing devices (respectively for the second plastic base material and the carbon fiber base material, for the third plastic base material and the glass fiber base material, and for the fourth plastic base material and the aramid fiber base material) are operated individually. The glass fiber base material and the aramid fiber base material are grinded to respectively maintain a fiber length of at least 10 millimeters in the mixing devices.

In the step of injection molding, a mixture of the third plastic base material and the glass fiber base material is transported into a third gate of the molding device, and a mixture of the fourth plastic base material and the aramid fiber base material is transported into a fourth gate of the molding device, wherein the position of the second gate is higher than the positions of other gates. The first plastic base material, the mixture of the carbon fiber base material and the second plastic base material, the mixture of the glass fiber base material and the third plastic base material, and the mixture of the aramid fiber base material and the fourth plastic base material are injected into the molding device to form the composite long fiber product. After injection, the mixture of the carbon fiber base material and the second plastic base material can diffuse to spread uniformly in the molding device, and is excluded from the injection positions of the aramid fiber base material and the glass fiber base material by means of the structure of the molding device. The mixture of the glass fiber base material and the third plastic base material, and the mixture of the aramid fiber base material and the fourth plastic base material are limited at the injection positions.

In the composite and long fiber product, the carbon fiber base material is spread uniformly in the composite long fiber product, and the glass fiber base material and the aramid fiber base material are limited at the demanded positions. The composite long fiber product can be especially applied on a housing of an electronic product. The plastic base materials that are mixed with the glass fiber base material and the aramid fiber base material have higher strength than a plastic base material. Furthermore, the aramid fiber base material and the glass fiber base material are insulated, such that the aramid fiber base material and the glass fiber base material can be injected to the positions corresponding to the signal send-and-receive position on the electronics product and can act as a reinforcing portion for electromagnetic penetration. The other portion on the electronics product, which has no need for electromagnetic penetration and corresponds to the mixture of the plastic base materials and the carbon fiber base material, can further increase the intensity.

Therefore, because the composite long fiber product is made by an injection technique, the composite long fiber product can have an improved yield and a reasonable cost. Further, the average lengths of the fiber base materials are at least 10 millimeters, such that fiber floating can be reduced effectively. The composite long fiber product can achieve a desired thickness. Warpage hardly occurs to the composite long fiber product, such that the composite long fiber product can have a smooth surface.

From the above description, it is noted that the present invention has the following advantages:

1. The carbon fiber base material is grinded to maintain the length of at least 10 millimeters. Then, the carbon fiber base material and the plastic base materials are injected into the molding device and to form the composite long fiber product. After the mixture of the carbon fiber base material and the plastic base materials is injected, the carbon fiber base material can diffuse in the molding device uniformly by arranging the relative positions of the gates of the molding device. Therefore, the composite long fiber product has a high intensity due to the carbon fiber base material, and has a low cost due to the injection technology. The manufacturing method can be applied in commercial products easily and can reduce a cost of the commercial products effectively.

2. The glass fiber base material and the aramid fiber base material also can be mixed with the plastic base material. Furthermore, the glass fiber base material and the aramid fiber base material can be injected and limited at the injection portion by arranging the gates for the glass fiber base material and the aramid fiber base material. Therefore, the composite long fiber product can be applied for electronic products, wherein a signal reception position on the electronic products corresponds to the carbon fiber base material, and other positions on the electronic products correspond to the aramid fiber base material and the glass fiber base material.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A manufacturing method of a composite long fiber product having steps of:
    preparing base materials: preparing a first plastic base material, a second plastic base material, and a carbon fiber base material;
    mixing the base materials: transporting the second plastic base material and the carbon fiber base material into a first mixing device, grinding the carbon fiber base material, wherein an average length of the grinded carbon fiber base material is at least 10 millimeters, and then mixing the grinded carbon fiber base material and the second plastic base material in the first mixing device; and
    injection molding: transporting the first plastic base material into a first gate of a molding device, transporting a mixture of the carbon fiber base material and the second plastic base material into a second gate of the molding device, wherein a position of the second gate is higher than a position of the first gate, and then injecting the first plastic base material from the first gate and the mixture of the carbon fiber base material and the second plastic base material from the second gate into the molding device.

2. The manufacturing method of a composite long fiber product as claimed in claim 1, wherein
    the step of preparing base materials further comprises a step of preparing a third plastic base material and a glass fiber base material;
    the step of mixing the base materials further comprises steps of transporting the third plastic base material and the glass fiber base material into a second mixing device, grinding the glass fiber base material, wherein an average length of the grinded glass fiber base material is at least 10 millimeters, and then mixing the third plastic base material and the grinded glass fiber base material in the second mixing device; and
    the step of injection molding further comprises steps of transporting a mixture of the third plastic base material and the glass fiber base material into a third gate of the molding device, wherein the position of the second gate is higher than a position of the third gate, injecting the mixture of the third plastic base material and the glass fiber base material in the molding device at the same time with the first plastic base material and the mixture of the carbon fiber base material and the second plastic base material, such that the mixture of the carbon fiber base material and the second plastic base material diffuses uniformly in the molding device but is excluded from an injection position of the mixture of the glass fiber base material and the third plastic base material, and the mixture of the glass fiber base material and the third plastic base material is limited at the injection position.

3. The manufacturing method of a composite long fiber product as claimed in claim 2, wherein the step of preparing base materials further comprises a step of preparing a fourth plastic base material and an aramid fiber base material;

the step of mixing the base materials further comprises steps of transporting the fourth plastic base material and the aramid fiber base material into a third mixing device, grinding the aramid fiber base material, wherein an average length of the grinded aramid fiber base material is at least 10 millimeters, and then mixing the fourth plastic base material and the grinded aramid fiber base material in the third mixing device; and the step of injection molding further comprises steps of transporting a mixture of the fourth plastic base material and the aramid fiber base material into a fourth gate of the molding device, wherein the position of the second gate is higher than a position of the fourth gate, injecting the mixture of the fourth plastic base material and the aramid fiber base material in the molding device at the same time with the first plastic base material, the mixture of the carbon fiber base material and the second plastic base material, and the mixture of the third plastic base material and the glass fiber base material, such that the mixture of the carbon fiber base material and the second plastic base material can diffuse uniformly in the molding device but is excluded from the injection position of the mixture of the glass fiber base material and the third plastic base material and an injection position of the mixture of the aramid fiber base material and the fourth plastic base material, and the mixture of the aramid fiber base material and the fourth plastic base material can be limited at the injection position of mixture of the aramid fiber base material and the fourth plastic base material.

\* \* \* \* \*